United States Patent
Arndt et al.

(10) Patent No.: US 12,030,984 B2
(45) Date of Patent: Jul. 9, 2024

(54) SOIL RELEASE POLYESTERS FOR USE IN DETERGENT COMPOSITIONS

(71) Applicant: Clariant International Ltd., Muttenz (CH)

(72) Inventors: Matthias Arndt, Bobenheim-Roxheim (DE); Martijn Gillissen, Bocholtz (NL); Kevin Mutch, Frankfurt (DE)

(73) Assignee: Clariant International Ltd, Muttenz (CH)

( * ) Notice: Subject to any disclaimer, the term of this patent is extended or adjusted under 35 U.S.C. 154(b) by 747 days.

(21) Appl. No.: 17/057,844

(22) PCT Filed: May 13, 2019

(86) PCT No.: PCT/EP2019/062165
§ 371 (c)(1),
(2) Date: Nov. 23, 2020

(87) PCT Pub. No.: WO2019/224030
PCT Pub. Date: Nov. 28, 2019

(65) Prior Publication Data
US 2021/0261728 A1    Aug. 26, 2021

(30) Foreign Application Priority Data
May 24, 2018    (EP) ..................... 18173987

(51) Int. Cl.
| | |
|---|---|
| *C08G 63/83* | (2006.01) |
| *C08G 63/183* | (2006.01) |
| *C08G 63/672* | (2006.01) |
| *C08G 63/85* | (2006.01) |
| *C11D 3/00* | (2006.01) |
| *C11D 3/37* | (2006.01) |

(52) U.S. Cl.
CPC ......... *C08G 63/672* (2013.01); *C08G 63/183* (2013.01); *C08G 63/83* (2013.01); *C08G 63/85* (2013.01); *C11D 3/0036* (2013.01); *C11D 3/3715* (2013.01); *C11D 2111/12* (2024.01)

(58) Field of Classification Search
CPC .... C08G 63/672; C08G 63/183; C08G 63/83; C08G 63/85; C11D 3/0036; C11D 3/3715; C11D 11/0017
USPC ....................................................... 528/301
See application file for complete search history.

(56) References Cited

U.S. PATENT DOCUMENTS

| | | | |
|---|---|---|---|
| 2,182,306 A | 12/1939 | Ulrich | |
| 2,208,095 A | 7/1940 | Esselmann | |
| 2,553,696 A | 5/1951 | Wilson | |
| 2,806,839 A | 9/1957 | Crowther | |
| 3,033,746 A | 5/1962 | Moyle | |
| 3,893,929 A | 7/1975 | Basadur | |
| 3,959,230 A | 5/1976 | Hays | |
| 3,962,152 A | 6/1976 | Nicol | |
| 4,132,680 A | 1/1979 | Nicol | |
| 4,702,857 A | 10/1987 | Gosselink | |
| 4,711,730 A | 12/1987 | Gosselink | |
| 4,713,194 A | 12/1987 | Gosselink | |
| 4,759,876 A | 7/1988 | Crossin | |
| 4,760,100 A | 7/1988 | McDaniel | |
| 4,956,447 A | 9/1990 | Gosselink | |
| 5,142,020 A | 8/1992 | Kud | |
| 6,153,723 A | 11/2000 | Lang | |
| 6,255,274 B1 | 7/2001 | Becherer | |

(Continued)

FOREIGN PATENT DOCUMENTS

| | | |
|---|---|---|
| CN | 1182751 | 5/1998 |
| DE | 19502181 | 8/1996 |

(Continued)

OTHER PUBLICATIONS

International Search Report for PCT/EP2013/002194, dated Sep. 20, 2013.

(Continued)

*Primary Examiner* — Terressa Boykin

(57) ABSTRACT

The invention relates to a polyester including two or more of the structural units (a1), one or more of the structural units (a2) and either one or two of the terminal groups (a3)

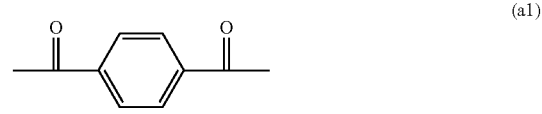

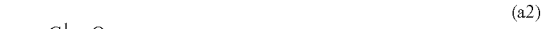

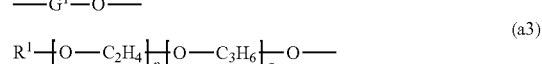

wherein $G^1$ is $(OC_2H_4)$, $(OC_3H_6)$, or a mixture of these, $R^1$ is methyl, p is, based on a molar average, a number of at least 60 to 130, q is 0.

Adjacent structural units (a1) are connected by the structural unit (a2). When only one terminal group (a3) is present in the polyester, the other terminal group is selected from the group consisting of OH, $OCH_3$, and $G^1OH$. Both terminal groups are linked to acyl groups derived from a dicarboxylic acid.

18 Claims, No Drawings

(56) References Cited

U.S. PATENT DOCUMENTS

| | | |
|---|---|---|
| 6,537,961 B1 | 3/2003 | Koch |
| 7,790,665 B2 | 9/2010 | Lang |
| 9,365,806 B2 | 6/2016 | Carswell |
| 9,732,308 B2 | 8/2017 | Fischer |
| 10,087,400 B2 | 10/2018 | Klug |
| 10,240,107 B2 | 3/2019 | Cohrs |
| 10,351,802 B2 | 7/2019 | Cohrs |
| 10,961,484 B2 | 3/2021 | Klug |
| 2001/0005737 A1 | 6/2001 | Loffler |
| 2004/0254091 A1 | 12/2004 | Crass |
| 2009/0036641 A1 | 2/2009 | Lang |
| 2010/0098655 A1 | 4/2010 | Lang |
| 2011/0095109 A1 | 4/2011 | Borchers |
| 2011/0098418 A1 | 4/2011 | Morschhaeuser |
| 2013/0200290 A1 | 8/2013 | Morschhaeuser |
| 2015/0203630 A1 | 7/2015 | Fischer |
| 2015/0218491 A1 | 8/2015 | Morschhaeuser |
| 2015/0240029 A1 | 8/2015 | Fischer |
| 2016/0280847 A1 | 9/2016 | Müssig |
| 2016/0311208 A1 | 10/2016 | Nederberg |
| 2017/0145348 A1* | 5/2017 | Klug ............... C11D 3/2044 |
| 2017/0321154 A1* | 11/2017 | Cohrs ............ C11D 11/0017 |
| 2017/0327773 A1* | 11/2017 | Cohrs ............. C11D 3/3715 |
| 2019/0330565 A1 | 10/2019 | Mutch |
| 2020/0063070 A1 | 2/2020 | Mutch |
| 2020/0207910 A1 | 7/2020 | Mutch |
| 2020/0255766 A1 | 8/2020 | Green |
| 2020/0407494 A1 | 12/2020 | Mutch |
| 2021/0188759 A1 | 6/2021 | Cohrs |
| 2021/0189290 A1 | 6/2021 | Cohrs |
| 2021/0261728 A1 | 8/2021 | Arndt |
| 2021/0371588 A1 | 12/2021 | Mutch |

FOREIGN PATENT DOCUMENTS

| | | | |
|---|---|---|---|
| DE | 19735715 A1 | 2/1999 | |
| DE | 102007013217 | 9/2008 | |
| EP | 0035263 | 9/1981 | |
| EP | 0185427 | 6/1986 | |
| EP | 0199403 | 10/1986 | |
| EP | 0336595 | 10/1989 | |
| EP | 0398137 | 11/1990 | |
| EP | 0442101 A1 | 8/1991 | |
| EP | 0523956 | 1/1993 | |
| EP | 1106169 A2 | 6/2001 | |
| EP | 1106169 A3 | 10/2001 | |
| EP | 1966273 | 9/2008 | |
| EP | 2135931 | 12/2009 | |
| EP | 2276824 | 1/2011 | |
| EP | 2692842 | 2/2014 | |
| EP | 2966160 | 1/2016 | |
| EP | 3071625 | 9/2016 | |
| EP | 3235848 A1 | 10/2017 | |
| EP | 3360911 | 8/2018 | |
| EP | 3710571 | 9/2020 | |
| GB | 1088984 | 10/1967 | |
| GB | 1466639 | 3/1977 | |
| JP | 2015105373 A | 6/2015 | |
| WO | 9850509 | 11/1998 | |
| WO | 0158980 | 8/2001 | |
| WO | 2006133867 | 12/2006 | |
| WO | 2007079850 | 7/2007 | |
| WO | 2007138054 | 12/2007 | |
| WO | 2009153184 | 12/2009 | |
| WO | 2011000158 | 1/2011 | |
| WO | 2012104159 | 8/2012 | |
| WO | 2014019792 | 2/2014 | |
| WO | WO-2016075178 A1 * | 5/2016 | ......... C11D 11/0017 |
| WO | WO-2016075179 A1 * | 5/2016 | ......... C08G 63/672 |
| WO | 2018103895 | 6/2018 | |
| WO | 2019224030 A1 | 11/2019 | |
| WO | WO2019224030 | 11/2019 | |

OTHER PUBLICATIONS

International Search Report for PCT/EP2018/082718, dated Jan. 28, 2019, 2 pages.

International Search Report for PCT/EP2019/062165 dated Nov. 28, 2019, 3 pages.

International Search Report for PCT/EP2021/063267, dated Jul. 20, 2021, 13 pages.

Machine translation of DE 102007013217, Sep. 18, 2008.

Written Opinion of the International Searching Authoirty for PCT/EP2013/002194, dated Sep. 19, 2013.

* cited by examiner

SOIL RELEASE POLYESTERS FOR USE IN DETERGENT COMPOSITIONS

The invention relates to specific polyesters suitable for both liquid and solid detergent compositions, a process for their preparation, their use as soil release agents and detergent compositions comprising surfactants and said polyesters.

Polyester containing fabrics can be surface modified to increase the hydrophilicity of the fabric, which can improve soil removal. Such surface modification can be achieved through direct treatment of the fabric, as outlined for example in GB 1,088,984, or more preferably through deposition of a surface modifying polymer in a washing process, as disclosed for example in U.S. Pat. No. 3,962,152. The renewable soil release finish imparted through washing ensures the continuous protection of the fiber from oily stains.

The polymers used in these processes typically consist of a polyester midblock with either one or two endblocks of polyethylene glycol, as further outlined in U.S. Pat. Nos. 3,959,230 and 3,893,929.

The inclusion of anionic moieties in the polymer structure is known to improve the efficacy of these soil release polymers and in particular, improve their anti-redeposition properties. For example, DE 10 2007 013 217 and EP 1 966 273 disclose anionic polyesters that may be used as soil release agents in laundry detergents. Such anionic soil release polymers are particularly well suited for use in powder detergents due to their handling properties and compatibility with the detergent composition. However, the solubility of such materials in aqueous solutions is substantially lower than their nonionic counterparts for liquid formulations, making them unsuitable or uneconomical in liquid formulations. Moreover, such anionic polymers are typically more hygroscopic than their nonionic counterparts. This can lead to storage stability issues of the polymer powders and detergents incorporating these powders, such as agglomeration of the powders or hydrolytic instability due to water uptake.

The use of nonionic soil release agents in liquid laundry detergents is well known in the art. GB 1,466,639, U.S. Pat. Nos. 4,132,680, 4,702,857, EP 0 199 403, U.S. Pat. Nos. 4,711,730, 4,713,194 and 4,759,876 disclose aqueous detergent compositions containing soil release polymers. Such polymers are typically liquids to waxy solids with high tackiness that tend towards sticking, making them unsuitable in powder formulations. Nonionic soil release agents for powder detergents have also been developed. For example, EP 2 276 824 disclose nonionic multiblock, optionally branched polymers. Such polymers are solid, non tacky and stable towards hydrolysis. However, their soil release performance is typically not as good as that of their anionic counterparts. For the latter nonionic polymers, the solubility in aqueous solutions is substantially lower than that of their counterparts for liquid formulations, making them unsuitable or uneconomical in liquid formulations.

Soil release agents for laundry detergents are typically supplied to laundry detergent formulators as either highly concentrated liquids for liquid laundry formulations or powders or granules for powder laundry formulations. Even though it would be beneficial to use a single soil release agent for both liquid and powdered detergent formulations, soil release agents developed for liquid detergents are typically not suitable for use in powdered detergents and vice versa.

Therefore, it was an object of the present invention to provide new polyesters which have a beneficial hygroscopicity, possess advantageous soil release properties and at the same time possess beneficial handling properties for their use in powdered and liquid detergent compositions.

Surprisingly, it has been found that this problem can be solved by polyesters comprising two or more of the structural units (a1), one or more of the structural units (a2) and either one or two of the terminal groups (a3)

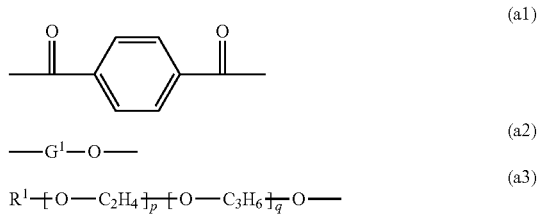

$$—G^1—O—$$ (a2)

$$R^1{-}[O—C_2H_4]_p{-}[O—C_3H_6]_q{-}O—$$ (a3)

wherein $G^1$ is one or more of $(OC_nH_{2n})$ with n being a number of from 2 to 10, preferably from 2 to 6 and more preferably $(OC_2H_4)$, $(OC_3H_6)$, $(OC_4H_8)$ or $(OC_6H_{12})$, $R^1$ is a $C_{1-30}$ alkyl, preferably $C_{1-4}$ alkyl and more preferably methyl, p is, based on a molar average, a number of at least 60, preferably from 70 to 200 and more preferably from 90 to 130, q is, based on a molar average, a number of from 0 to 40, preferably from 0 to 30, more preferably from 0 to 20, and most preferably from 0 to 10 where the $(OC_3H_6)—$ and $(OC_2H_4)—$ groups of the terminal group (a3) may be arranged blockwise, alternating, periodically and/or statistically, preferably blockwise and/or statistically either of the groups $(O—C_3H_6)—$ and $(O—C_2—H_4)—$ of the terminal group (a3) can be linked to $R^1—$ and O—, adjacent structural units (a1) are connected by the structural unit (a2), in the case that only one terminal group (a3) is present in the polyester, the other terminal group is selected from the group consisting of OH, $OCH_3$ and $G^1OH$, and both terminal groups are linked to acyl groups derived from a dicarboxylic acid, preferably structural units (a1).

Therefore, the present invention provides polyesters comprising, or consisting of, two or more of the structural units (a1), one or more of the structural units (a2) and either one or two of the terminal groups (a3) as defined above.

The invention further provides a process for the preparation of a polyester according to the invention comprising the steps of heating dimethyl terephthalate, optionally one or more dimethyl esters of further dicarboxylic acids, one or more glycols H-$G^1$-OH, and one or more alkyl capped polyalkylene glycols $R^1—(OC_2H_4)_p—(OC_3H_6)_q—O—H$ with the addition of a catalyst to temperatures of from 160 to 220° C., preferably beginning at atmospheric pressure, and then continuing the reaction under reduced pressure at temperatures of from 160 to 240° C.

The invention further provides the use of a polyester according to the invention as a soil release agent.

The invention further provides the use of a polyester according to the invention in a solid or liquid detergent composition.

The invention further provides a solid or liquid detergent composition comprising a) one or more polyesters according to the invention and b) one or more surfactants.

Polyesters having lower molecular weight structural groups have already been disclosed in the prior art. For example in U.S. Pat. No. 4,702,857, such polymers and their use as soil release additives are described. However, the shown examples have significantly lower molecular weights with values of p between 7.5 and 43, and do not show the desired melting point and flow factor properties.

The polyesters of the invention have an advantageous stability in alkaline environment, possess a beneficial solubility and advantageously are clearly soluble in alkaline compositions such as heavy duty washing liquids and also possess advantageous soil release properties. Furthermore, the polyesters of the invention have advantageous solid handling properties and advantageously low hygroscopicity. In washing or laundry detergent compositions, they result in a beneficial washing performance.

Structural unit (a1) is derived from terephthalic acid. In further embodiments the polyester of the invention comprises one or more structural units (a1')—in addition to the structural units (a1)—where (a1') is a unit —C(=O)-A-C(=O)—, where A is derived from a dicarboxylic acid different from terephthalic acid, preferably from phthalic acid, isophthalic acid, naphthalene-1,4-dicarboxylic acid, naphthalene-2,6,-dicarboxylic acid, tetrahydrophthalic acid, trimellitic acid, diphenoxyethane-4,4'-dicarboxylic acid, diphenyl-4,4'-dicarboxylic acid, 2,5-furandicarboxylic acid, 5-sulfoisophthalic acid, 3-sulfophthtalic acid, 4-sulfophthtalic acid, adipic acid, sebacic acid, decan-1,10-dicarboxylic acid, fumaric acid, succinic acid, 1,4-cyclohexanedicarboxylic acid cyclohexanediacetic acid, glutaric acid and azeleic acid, more preferably phthalic acid, isophthalic acid, 2,5-furandicarboxylic acid and/or 5-sulfoisophthalic acid.

In the case that one polyester molecule comprises two or more of the structural units (a1') the definition of A may vary between those structural units (a1').

In one preferred embodiment the polyester of the invention does not comprise any structural units (a1'), i.e. the acid component consists exclusively of structural units (a1).

In a further embodiment the polyester of the invention comprises one or more structural units (a1'), preferably in an amount of from 0.1 to 40 wt.-%, more preferably 1 to 30 wt.-%, in particular 1 to 20 wt.-%, based on the total weight of the polyester.

The structural units (a1) and optionally (a1') are linked indirectly via the structural unit (a2), which—in the case of structural units (a1)—results in the following structural entity:

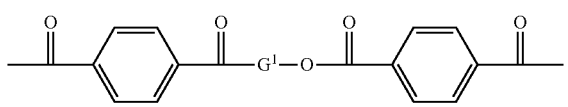

The terminal group (a3) is linked to an acyl group derived from a dicarboxylic acid, preferably to the structural unit (a1), which, in the latter case, results in the following structural entity:

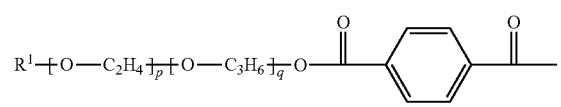

In the case that one polyester molecule comprises two or more of the structural units (a2), the definition of the group $G^1$ may vary between those structural units (a2). Furthermore, in the case that one polyester molecule comprises two of the terminal groups (a3) the definition of $R^1$ may vary between those terminal groups.

In the case that both p and q of the terminal group $R^1$—$(OC_2H_4)_p$—$(OC_3H_6)_q$—O adopt non-zero values, the $(OC_3H_6)$— and $(OC_2H_4)$— groups may be arranged blockwise, alternating, periodically and/or statistically, preferably blockwise and/or statistically. This means that in the terminal group $R^1$—$(OC_2H_4)_p$—$(OC_3H_6)_q$—O, the groups $(OC_3H_6)$— and $(OC_2H_4)$— may be arranged, for example, in a purely statistically or blockwise form but may also be arranged in a form which could be considered as both statistical and blockwise, e.g. small blocks of $(OC_3H_6)$— and $(OC_2H_4)$— arranged in a statistical manner, or in a form wherein adjacent instances of statistical and blockwise arrangements of the groups $(OC_3H_6)$— and $(OC_2H_4)$— exist.

Either of the groups $(OC_3H_6)$— and $(OC_2H_4)$— can be linked to $R^1$— and —O. This means, for example, that both $R^1$— and —O may be connected to a $(OC_3H_6)$— group, they may both be connected to a $(OC_2H_4)$— group or they may be connected to different groups selected from $(OC_2H_4)$— and $(OC_3H_6)$—.

In a preferred embodiment of the invention "q" is 0.

In a further preferred embodiment of the invention the group $R^1$ is $C_{1-4}$ alkyl and preferably is methyl.

The structural unit $G^1$ is one or more of $(OC_nH_{2n})$ with n being a number of from 2 to 10, preferably from 2 to 6 and more preferably $(OC_2H_4)$, $(OC_3H_6)$, $(OC_4H_8)$ or $(OC_6H_{12})$. In a particularly preferred embodiment the structural unit $G^1$ is $(OC_2H_4)$ and/or $(OC_3H_6)$.

The groups —$OC_2H_4$ in the structural units "$R^1$—$(OC_2H_4)_p$—$(OC_3H_6)_q$—O" and in the structural units $G^1$ are of the formula —O—$CH_2$—$CH_2$—.

The groups —$OC_3H_6$ in the structural units "$R^1$—$(OC_2H_4)_p$—$(OC_3H_6)_q$—O" and in the structural units $G^1$ are of the formula —O—$CH(CH_3)$—$CH_2$— or —O—$CH_2$—$CH(CH_3)$—, i.e. of the formula

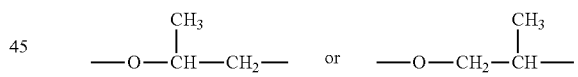

The groups $(OC_4H_8)$ in the structural units $G^1$ are preferably of the formula —O—$CH(CH_3)$—$CH(CH_3)$—, i.e. of the formula

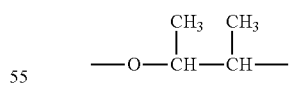

The groups $(OC_6H_{12})$ in the structural units $G^1$ are preferably of the formula —O—$CH_2$—$CH(n\text{-}C_4H_9)$— or —O—$CH(n\text{-}C_4H_9)$—$CH_2$—, i.e. of the formula

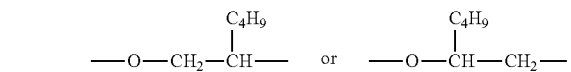

In the polyesters of the invention, the total amount of the terminal group (a3), based on the total weight of the polyester, is preferably at least 50 wt.-%, preferably from 60 to 90 wt.-% and more preferably from 70 to 85 wt.-%.

Preferably, the weight average molecular weight ($M_w$) of the inventive polyesters is from 6000 to 20000 g/mol. The weight average molecular weight ($M_w$) of the inventive polyesters may be determined by GPC analysis, preferably as detailed in the following: 10 μl of sample is injected onto a PSS Suprema column of dimensions 300×8 mm with porosity 30 Å and particle size 10 μm. The detection is monitored at 235 nm on a multiple wavelength detector. The employed eluent is 1.25 g/l of disodium hydrogen phosphate in a 45/55% (v/v) water/acetonitrile mixture. Separations are conducted at a flow-rate of 0.8 ml/min. Quantification is performed by externally calibrating standard samples of different molecular weight polyethylene glycols.

In the polyesters of the invention, the average number of structural units (a1) is preferably from 2 to 60, more preferably from 2 to 50, even more preferably from 3 to 40 and most preferably from 4 to 30.

In the polyesters of the invention, the total amount of structural units (a1) and (a2) and of the terminal group (a3), based on the total weight of the polyester, is preferably at least 50 wt.-%, more preferably at least 60 wt.-%, even more preferably at least 70 wt.-%.

In a preferred embodiment of the invention, the structural units are exclusively selected from the group consisting of structural units (a1) and (a2).

In a further embodiment of the invention the structural units are exclusively selected from the group consisting of structural units (a1), (a1') and (a2).

This means that in these two embodiments the polyester of the invention consist of structural units (a1), (a2) and the respective terminal groups, and—in the second case—of structural units (a1), (a1'), (a2) and the respective terminal groups.

In one particularly preferred embodiment of the invention, the polyesters of the invention, described in the following and further referred to as "Polyester A", consist of structural units selected from the group consisting of the structural units (a1) and (a2) and the terminal group (a3), where two or more of the structural units (a1), one or more of the structural units (a2) and either one or two of the terminal groups (a3) must be present

(a1)

(a2)

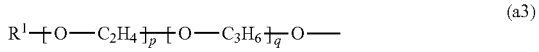
(a3)

wherein
$G^1$ is ($OC_3H_6$),
$R^1$ is $CH_3$,
P is based on a molar average, a number of from 90 to 130 and
q is 0.

In the Polyester A, adjacent structural units (a1) are connected by the structural unit (a2). Furthermore, in the case that only one terminal group (a3) is present in the polymer, the other terminal group is selected from the group consisting of OH, $OCH_3$, and $G^1OH$. Both terminal groups may only be linked to the structural unit (a1).

In the Polyester A, the average number of structural unit (a1) is preferably from 2 to 60, more preferably from 2 to 50, even more preferably from 3 to 40 and most preferably from 4 to 30.

The weight average molecular weight (Mw) of the Polyester A is preferably from 6000 to 20000 g/mol.

In another particularly preferred embodiment of the invention, the polyesters of the invention, described in the following and further referred to as "Polyester B", consist of structural units selected from the group consisting of the structural units (a1) and (a2) and the terminal groups (a3), where two or more of the structural units (a1), one or more of the structural units (a2) and either one or two of the terminal groups (a3) must be present

(a1)

(a2)

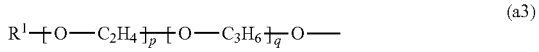
(a3)

wherein
$G^1$ is ($OC_3H_6$),
$R^1$ is $CH_3$,
p is based on a molar average, a number of from 90 to 120 and
q is based on a molar average, a number of from 2 to 5.

In the Polyester B, adjacent structural units (a1) are connected by the structural unit (a2). Furthermore, in the case that only one terminal group (a3) is present in the polymer, the other terminal group is selected from the group consisting of OH, $OCH_3$, and $G^1OH$. Both terminal groups may only be linked to the structural unit (a1). Furthermore, the ($OC_3H_6$)— and ($OC_2H_4$)— groups of the terminal group (a3) are arranged blockwise.

In the Polyester B, the average number of structural units (a1) is preferably from 2 to 60, more preferably from 2 to 50, and even more preferably from 3 to 40 and most preferably from 4 to 30

The weight average molecular weight (Mw) of the Polyester B is preferably from 6000 to 20000 g/mol.

The groups —$OC_2H_4$ in the structural units "$R^1$—($OC_2H_4$)$_p$—($OC_3H_6$)$_q$—O—" and in the structural units $G^1$ are of the formula —O—$CH_2$—$CH_2$—.

The groups —$OC_3H_6$ in the structural units "$R^1$—($OC_2H_4$)$_p$—($OC_3H_6$)$_q$—O—" and in the structural units $G^1$ are of the formula —O—$CH(CH_3)$—$CH_2$— or —O—$CH_2$—$CH(CH_3)$—, i.e. of the formula

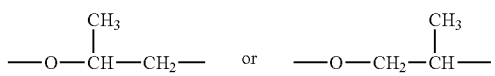

The groups ($OC_4H_8$) in the structural units $G^1$ are preferably of the formula —O—$CH(CH_3)$—$CH(CH_3)$—, i.e. of the formula

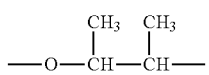

The groups (OC$_6$H$_{12}$) in the structural units G$^1$ are preferably of the formula —O—CH$_2$—CH(n-C$_4$H$_9$)— or —O—CH(n-C$_4$H$_9$)—CH$_2$—, i.e. of the formula

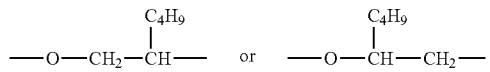

Preferably, the polyesters of the invention have a melting point defined as the peak maximum from Differential Scanning calorimetry of at least 50° C. and more preferably of at least 55° C.

The polyesters of the invention are solids at room temperature and have advantageous properties for their processing into granules of a defined particle size. Granulation can be carried out in such a way that the polymer melt formed during synthesis is further processed directly out of the reactor. The polymer melt can be solidified by cooling and converted into flakes, plate fragments or shaped bodies. Preferably the cooling takes place on cooled surfaces, such as on a drum flaker or belt flaker.

The resulting flakes, plate fragments or shaped bodies can then be brought to the desired grain size by grinding and sieving. The temperature in such equipment tends to rise during the grinding process. Although this temperature increase can be avoided by, for example, cooling the equipment, it is preferable for the polyesters to have a melting point significantly above the expected temperatures in the grinding equipment. The grain size of the granules produced in this way is generally in the range of 100-2000 μm.

The flowability of the resulting polyester granules can be described by the so-called flow factor (ffc). The larger the ffc value, the better a bulk solid flows. Typically a classification according to Jenike is applied: ffc<1 not flowing, 1<ffc<2 very cohesive, 2<ffc<4 cohesive, 4<ffc<10 easy-flowing, 10<ffc free-flowing. Preferably, the granules exhibit a very good free-flowability, even after storage, indicated by a flow factor of ≥10.

Preferably, the polyesters of the invention have a flow factor (ffc) of at least 10. The flow factor of a powder or granules may be determined using a ring shear tester, preferably as detailed in the following. Samples with a particle size between 100 and 1600 μm were measured on a ring shear tester RST-01 (by Dr.-Ing Dietmar Shulze Schüttgutesstechnik), using a vertical tension of 6500 Pa. The resulting flow factor (ffc) is the ratio of the resulting consolidation stress (σ1) to unconfined yield strength (σc).

The polyesters of the invention may be used in substance, i.e. as granules, but may also be provided as solutions. The solutions exhibit beneficial handling properties and are more easily dosed. Preferably, the solutions comprise the polyesters of the invention in an amount of from 25 to 70 weight-% based on the total mass of the solution. Suitable solvents for such solutions are water, ethylene glycol, 1,2-propylene glycol, 1,3-propylene glycol, 1,2-butylene glycol, 1,3-butylene glycol, 1,4-butylene glycol, butyl glycol, butyl diglycol and butyl polyglycol.

Therefore, in a further embodiment of the invention the polyester of the invention is provided as a solution comprising one or more polyesters of the invention in an amount of from 25 to 70 weight-% based on the total mass of the solution.

For the preparation of the polyesters of the invention, typically a two stage process is used of either direct esterification of diacids and diols or transesterification of diesters and diols, followed by a polycondensation reaction under reduced pressure.

A suitable process for the preparation of the polymers of the present invention comprises the steps of heating dimethyl terephthalate (DMT), optionally one or more dimethyl esters of further dicarboxylic acids (i.e. dicarboxylic acids different from terephthalic acid), one or more glycols H-G$^1$-OH, and one or more alkyl capped polyalkylene glycols

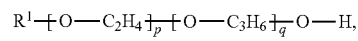

where the symbols and indices have the meanings given above, with the addition of a catalyst, to temperatures of 160 to 220° C., preferably beginning at atmospheric pressure, and then continuing the reaction under reduced pressure at temperatures of from 160 to 240° C.

Reduced pressure preferably means a pressure of from 0.1 to 900 mbar and more preferably a pressure of from 0.5 to 500 mbar.

Typical transesterification and condensation catalysts known in the art can be used for the preparation of the copolymers, such as antimony, germanium and titanium based catalysts. Preferably, tetraisopropyl orthotitanate (IPT) and sodium acetate (NaOAc) are used as the catalyst system in the process.

The inventive polyesters may advantageously be prepared by a process which comprises heating dimethyl terephthalate (DMT), one or more alkylene glycols, and R$^1$—(OC$_2$H$_4$)$_p$—(OC$_3$H$_6$)$_q$—OH, wherein R$^1$, p and q are described elsewhere in the text, with the addition of a catalyst, to temperatures of from 160 to 220° C., firstly at atmospheric pressure, and then continuing the reaction under reduced pressure at temperatures of from 160 to 240° C.

In a preferred embodiment of the invention the process of the invention is characterized in that
a) dimethyl terephthalate, one or more alkylene glycols, H-G$^1$-OH, and R$^1$—(OC$_2$H$_4$)$_p$—(OC$_3$H$_6$)$_q$—OH, wherein R$^1$, p and q are described elsewhere in the text, and a catalyst are added to a reaction vessel, heated under inert gas, preferably nitrogen, to a temperature of from 160° C. to 220° C. to remove methanol and then pressure is reduced to below atmospheric pressure, preferably to a pressure of from 200 to 900 mbar and more preferably to a pressure of from 400 to 600 mbar for completion of the transesterification, and
b) in a second step the reaction is continued at a temperature of from 180° C. to 240° C. and at a pressure of from 0.1 to 10 mbar and preferably of from 0.5 to 5 mbar to form the polyester.

In a further aspect of the invention there is provided the use of the polyesters of the invention as soil release agents, preferably in solid or liquid detergent compositions and fabric care products.

"Soil release agent" as used herein means an agent that enhances soil removal during laundering by modifying the surface of the fabric that is laundered, preferably by increasing surface polarity.

Further provided are solid or liquid detergent compositions comprising a) one or more polyesters of the invention and b) one or more surfactants.

The solid or liquid detergent compositions are preferably solid or liquid laundry detergent compositions.

In one embodiment of the invention the detergent composition is solid.

In a further embodiment of the invention the detergent composition is liquid.

Besides the one or more polyesters of the invention a) and the one or more surfactants b), the detergent compositions may comprise one or more optional ingredients, e.g. they may comprise conventional ingredients commonly used in laundry detergent compositions. Examples of optional ingredients include, but are not limited to builders, bleaching agents, bleach active compounds, bleach activators, bleach catalysts, photobleaches, dye transfer inhibitors, color protection agents, anti-redeposition agents, dispersing agents, fabric softening and antistatic agents, fluorescent whitening agents, enzymes, enzyme stabilizing agents, foam regulators, defoamers, malodour reducers, preservatives, disinfecting agents, hydrotopes, fibre lubricants, anti-shrinkage agents, buffers, fragrances, processing aids, colorants, dyes, pigments, anti-corrosion agents, fillers, stabilizers and other conventional ingredients for washing or laundry detergent compositions.

The one or more polyesters a) are present in the detergent compositions in an amount of preferably at least 0.1 wt.-%, more preferably from 0.1 wt.-% to 10 wt.-%, even more preferably from 0.2 wt.-% to 5 wt.-% and extraordinarily preferably from 0.2 wt.-% to 3 wt.-%, in each case based on the total weight of the laundry detergent composition.

The detergent compositions of the invention comprise one or more surfactants as component b).

Surfactants assist in removing soil from textile materials and also assist in maintaining removed soil in solution or suspension in the wash liquor.

Preferably, the one or more surfactants of component b) of the detergent compositions are selected from the group consisting of anionic, nonionic, cationic and zwitterionic surfactants, and more preferably from the group consisting of anionic, nonionic and zwitterionic surfactants.

Anionic Surfactants

Suitable anionic surfactants that may be used are any of the conventional anionic surfactant types typically used in liquid and/or powder detergent products. These include alkyl sulfonates, alkyl ether sulfates, alkyl sulfates, alkyl ester sulfonates and soaps. Preferred anionic surfactants are alkylbenzene sulfonates, alkyl ether sulfates, alkyl sulfates and soaps.

Preferred alkyl sulfonates are alkylbenzene sulfonates, particularly linear alkylbenzene sulfonates (LAS) having an alkyl chain length of $C_8$-$C_{15}$. Possible counter ions for concentrated alkaline liquids are ammonium ions, e.g. those generated by the neutralization of alkylbenzene sulfonic acid with one or more ethanolamines, for example monoethanolamine (MEA) and triethanolamine (TEA), or alternatively, alkali metals, e.g. those arising from the neutralization of alkylbenzene sulfonic acid with alkali hydroxides. The linear alkyl benzene sulfonate surfactants may be LAS with an alkyl chain length of preferably from 8 to and more preferably from 12 to 14. The neutralization of the acid may be performed before addition to the laundry detergent compositions or in the formulation process through excess addition of neutralizing agent.

Preferred alkyl ether sulfates (AES) are alkyl polyethoxylate sulfate anionic surfactants of the formula $R^2O(C_2H_4O)_ySO_3^-M^+$ wherein $R^2$ is a saturated or unsaturated alkyl chain having preferably from 10 to 22 carbon atoms, and more preferably from 12 to 16 carbon atoms, $M^+$ is a cation which makes the compound water-soluble, preferably an ammonium cation, a substituted ammonium cation, an alkali metal cation, or other material chosen from the list of buffers, y averages preferably from 1 to 15, more preferably from 1 to 3 and even more preferably is 3.

Preferred alkyl sulfates (AS) are surfactants of the formula $R^3OSO_3^-M^+$ wherein $R^3$ is a linear or branched alkyl chain having preferably from 8 to 24 carbon atoms, and more preferably from 12 to 18 carbon atoms $M^+$ is a cation which makes the compound water-soluble, preferably an ammonium cation, a substituted ammonium cation, an alkali metal cation, or other material chosen from the list of buffers Soaps are preferably fatty acids and more preferably linear saturated or unsaturated fatty acids having from 10 to 18 carbon atoms.

Nonionic Surfactants

Nonionic surfactants include primary and secondary alcohol ethoxylates, especially $C_8$-$C_{20}$ aliphatic alcohol ethoxylated with an average of from 1 to 35 moles of ethylene oxide per mole of alcohol, and more especially the $C_{10}$-$C_{15}$ primary and secondary aliphatic alcohols ethoxylated with an average of from 1 to 10 moles of ethylene oxide per mole of alcohol. Non-ethoxylated nonionic surfactants include alkyl polyglycosides, glycerol monoethers and polyhydroxy amides (glucamide). Mixtures of nonionic surfactant may be used.

If included therein, the detergent composition contains preferably from 0.2 wt.-% to 40 wt.-% and more preferably 1 wt.-% to 20 wt.-% of a nonionic surfactant, such as alcohol ethoxylate, nonylphenol ethoxylate, alkylpolyglycoside, alkyldimethylamineoxide, ethoxylated fatty acid monoethanolamide, fatty acid monoethanolamide, polyhydroxy alkyl fatty acid amide, or N-acyl N-alkyl derivatives of glucosamine ("glucamides").

Zwitterionic Surfactants

The laundry detergent composition may comprise up to 10 wt.-% of a zwitterionic surfactant, e.g. amine oxide or betaine.

Typical amine oxides used are of the formula $R^4N(O)(CH_2R^5)_2$ wherein $R^4$ is a long chain moiety and each $CH_2R^5$ are short chain moieties, $R^5$ is preferably selected from the group consisting of H, $CH_3$ and —$CH_2OH$.

In general $R^4$ is a primary or branched hydrocarbyl moiety with a chain length of from 8 to 18, which can be saturated or unsaturated. Preferably, $R^4$ is a primary alkyl moiety with a chain length of 8 to 18 carbon atoms.

Preferred amine oxides have compositions wherein $R^4$ is a $C_8$-$C_{18}$ alkyl and $R^5$ is H. These amine oxides are illustrated by $C_{12-14}$ alkyldimethyl amine oxide, hexadecyl dimethylamine oxide, octadecylamine oxide.

A preferred amine oxide material is lauryl dimethylamine oxide, also known as dodecyldimethylamine oxide or DDAO. Such an amine oxide material is commercially available from The Global Amines Company Pte. Ltd. under the trade name Genaminox® LA.

Betaines may be alkyldimethyl betaines or alkylamido betaines, wherein the alkyl groups have $C_{12-18}$ chains.

In a preferred embodiment of the invention, the one or more surfactants of component b) of the detergent compositions are selected from the group consisting of linear alkyl benzene sulfonates, alkyl ether sulfates, alkyl sulfates, soaps, nonionic surfactants, amine oxides and betaines, and preferably the one or more surfactants of component b) of the detergent compositions are selected from the group consisting of linear alkyl benzene sulfonates, alkyl ether sulfates, alkyl sulfates, soaps and nonionic surfactants.

Additional Surfactants

Other surfactants than the preferred LAS, AES, AS, soaps and nonionic surfactants may be added to the mixture of detersive surfactants.

Preferably, the one or more surfactants of component b) of the detergent compositions, are present in an amount of at least 5 wt.-%, more preferably from 3 wt.-% to 65 wt.-%, even more preferably from 4 to 60 wt.-% and extraordinarily preferably from 5 wt.-% to 55 wt.-%, in each case based on the total weight of the detergent composition.

Further Optional Ingredients

In addition to the essential ingredients as claimed, the detergent compositions may comprise one or more optional ingredients, e.g. they may comprise conventional ingredients commonly used in detergent compositions, especially laundry detergent compositions. Examples of optional ingredients include, but are not limited to builders, bleaching agents, bleach active compounds, bleach activators, bleach catalysts, photobleaches, dye transfer inhibitors, colour protection agents, anti-redeposition agents, dispersing agents, fabric softening and antistatic agents, fluorescent whitening agents, enzymes, enzyme stabilizing agents, foam regulators, defoamers, malodour reducers, preservatives, disinfecting agents, hydrotropes, fibre lubricants, anti-shrinkage agents, buffers, fragrances, processing aids, colorants, dyes, pigments, anti-corrosion agents, fillers, stabilizers and other conventional ingredients for washing or laundry detergent compositions.

Polyalkoxylated Polyethyleneimine

For detergency boosting, it is advantageous to use a second polymer alongside the soil release polymers in the laundry detergent compositions of the present invention. This second polymer is preferably a polyalkoxylated polyethyleneimine (EPEI). Polyethylene imines are materials composed of ethylene imine units —$CH_2CH_2NH$— and, where branched, the hydrogen on the nitrogen is replaced by another chain of ethylene imine units. These polyethyleneimines can be prepared, for example, by polymerizing ethyleneimine in the presence of a catalyst such as carbon dioxide, sodium bisulfite, sulfuric acid, hydrogen peroxide, hydrochloric acid, acetic acid, and the like. Specific methods for preparing these polyamine backbones are disclosed in U.S. Pat. Nos. 2,182,306, 3,033,746, 2,208,095, 2,806,839, and 2,553,696.

Other Polymers

In addition to the polyester soil release polymer and the optional EPEI, the laundry detergent compositions may comprise other polymeric materials, for example: dye transfer inhibition polymers, anti redeposition polymers and cotton soil release polymers, especially those based on modified cellulosic materials. Especially, if EPEI is not present, the laundry detergent composition may further comprise a polymer of polyethylene glycol and vinyl acetate, for example the lightly grafted copolymers described in WO 2007/138054. Such amphiphilic graft polymers based on water soluble polyalkylene oxides as graft base and side chains formed by polymerisation of a vinyl ester component have the ability to enable reduction of surfactant levels whilst maintaining high levels of oily soil removal.

Hydrotropes

In the context of this invention a hydrotrope is a solvent that is neither water nor conventional surfactant that aids the solubilisation of the surfactants and other components, especially polymer and sequestrant, in the liquid to render it isotropic. Among suitable hydrotropes there may be mentioned as preferred: monopropylene glycol (MPG), glycerol, sodium cumene sulfonate, ethanol, other glycols, e.g. dipropylene glycol, diethers and urea. MPG and glycerol are preferred hydrotropes.

Enzymes

It is preferable that one or more enzymes selected from protease, mannanase, pectate lyase, cutinase, lipase, amylase, and cellulase may be present in the detergent compositions. Less preferred additional enzymes may be selected from esterase, peroxidase and oxidase. The enzymes are preferably present with corresponding enzyme stabilizers. The total enzyme content is preferably from 0 wt.-% to 5 wt.-%, more preferably from 0.2 wt.-% to 4 wt.-% and even more preferably from 0.4 wt.-% to 2 wt.-%.

Sequestrants

Sequestrants are preferably included. Preferred sequestrants include organic phosphonates, alkanehydroxy phosphonates and carboxylates available under the DEQUEST trade mark from Thermphos. The preferred sequestrant level is less than 10 wt.-% and preferably less than 5 wt.-% of the detergent composition. A particularly preferred sequestrant is HEDP (1-Hydroxyethylidene-1, 1,-diphosphonic acid), for example sold as Dequest 2010. Also suitable but less preferred as it gives inferior cleaning results is Dequest® 2066 (diethylenetriamine penta(methylene phosphonic acid) or Heptasodium DTPMP).

Buffers

In addition to agents optionally included for the generation of anionic surfactants, e.g. from LAS or fatty acids, the presence of buffer is preferred for pH control. Possible buffers are one or more ethanolamines, e.g. monoethanolamine (MEA) or triethanolamine (TEA). They are preferably used in the laundry detergent composition at levels of from 1 to 15 wt.-%. Other suitable amino alcohol buffer materials may be selected from the group consisting of compounds having a molecular weight above 61 g/mol, which includes MEA. Suitable materials also include, in addition to the already mentioned materials: monoisopropanolamine, diisopropanolamine, triisopropanolamine, monoamino hexanol, 2-[(2-methoxyethyl) methylamino]-ethanol, propanolamine, N-methylethanolamine, diethanolamine, monobutanolamine, isobutanolamine, monopentanolamine, 1-amino-3-(2-methoxyethoxy)-2-propanol, 2-methyl-4-(methylamino)-2-butanol and mixtures thereof.

Potential alternatives to amino ethanol buffers are alkali hydroxides such as sodium hydroxide or potassium hydroxide.

Builders

Further washing and cleaning ingredients which may be present include inorganic and/or organic builders in order to reduce the degree of hardness of the water. These builders may be present in weight fractions of from about 5 to about 80% in the detergent compositions. Inorganic builders include, for example, alkali metal, ammonium and alkanolammonium salts of polyphosphates, silicates, carbonates, sulfates and aluminosilicates.

Suitable organic builders include polycarboxyl compounds, such as, for example, ether polycarboxylates, ether hydroxypolycarboxylates, copolymers of maleic anhydride with ethylene or vinyl methyl ether, 1,3,5-trihydroxybenzene-2,4,6-trisulfonic acid and carboxymethyloxysuccinic acid, the alkali metal, ammonium and substituted ammonium salts of polyacetic acids, such as, for example, ethylenediaminetetraacetic acid and nitrilotriacetic acid, and also polycarboxylic acids, such as mellitic acid, succinic acid, oxydisuccinic acid, polymaleic acid, benzene-1,3,5-tricarboxylic acid, carboxymethyloxysuccinic acid, and soluble salts thereof. Builders based on citrates, for example citric acid and its soluble salts, in particular the sodium salt, are preferred polycarboxylic acid builders, which can also be used in granulated formulations, in particular together with zeolites and/or sheet silicates.

It may be advantageous to include fluorescer and/or bleach catalyst in the detergent compositions as further high efficiency performance additives. Perfume and colorants will also desirably be included. The detergent compositions may additionally contain viscosity modifiers, foam boosting agents, preservatives (e.g. bactericides), pH buffering agents, polyelectrolytes, anti-shrinking agents, anti-wrinkle agents, anti-oxidants, sunscreens, anti-corrosion agents, drape imparting agents, anti-static agents and ironing aids. The detergent compositions may further comprise pearlisers and/or opacifiers or other visual cues and shading dye.

Form, Packaging and Dosing

The detergent compositions may be in solid or in liquid form, including a gel form. The detergent compositions may be packaged as unit doses in a polymeric film soluble in the wash water. Alternatively the detergent compositions may be supplied in multidose plastics packs with a top or bottom closure. A dosing measure may be supplied with the pack either as a part of the cap or as an integrated system.

Further preferred embodiments of the invention may arise from the combination of above described preferred embodiments.

The invention will now be further described with reference to the following nonlimiting examples.

EXAMPLES

The examples below are intended to illustrate the invention in detail without, however, limiting it thereto. Unless explicitly stated otherwise, all percentages given are percentages by weight (% by wt. or wt.-%).

Polymer Preparation

General Procedure for the Preparation of the Polyesters of the Examples

The polyester synthesis is carried out by the reaction of dimethyl terephthalate (DMT), one or more alkylene glycols, and one or more alkyl capped polyalkylene glycols, using sodium acetate (NaOAc) and tetraisopropyl orthotitanate (IPT) as the catalyst system. The synthesis is a two-step procedure. The first step is a transesterification and the second step is a polycondensation.

Transesterification

The reactants are weighed into a reaction vessel at room temperature under a nitrogen atmosphere. The mixture is heated to an internal temperature of 65° C. for melting and homogenization, followed by the addition of 200 μl tetraisopropyl orthotitanate.

Within 2 hours, the temperature of the reaction mixture is continuously increased to 210° C. under a weak nitrogen flow and held at this temperature for 2 hours. During the transesterification methanol is released from the reaction and is distilled out of the system. After 2 h at 210° C. nitrogen is switched off and the pressure is reduced to 400 mbar over 3 h.

Polycondensation

The mixture is heated up to 230° C. At 230° C. the pressure is reduced to 1 mbar over 160 min. Once the polycondensation reaction has started, the alkylene glycol or mixture of alkylene glycols is distilled out of the system. The mixture is stirred for 4 h at 230° C. and a pressure of 1 mbar. After the end of this time period, the inner pressure of the reaction vessel is set back to 1 bar using $N_2$ and the polymer melt is subsequently removed from the reactor and allowed to solidify.

Key to Reactants Used in the Examples

| | |
|---|---|
| mPEG1000 | is mono hydroxyl-functional polyethylene glycol monomethyl ether, average molecular weight 1 kDa (Polyglykol M 1000, Clariant). |
| mPEG2000 | is mono hydroxyl-functional polyethylene glycol monomethyl ether, average molecular weight 2 kDa (Polyglykol M 2000, Clariant). |
| mPEG3000 | is mono hydroxyl-functional polyethylene glycol monomethyl ether, average molecular weight 3 kDa (Polyglykol M 3000, Clariant). |
| mPEG4000 | is mono hydroxyl-functional polyethylene glycol monomethyl ether, average molecular weight 4 kDa (Polyglykol M 4000, Clariant). |
| mPEG5000 | is mono hydroxyl-functional polyethylene glycol monomethyl ether, average molecular weight 5 kDa (Polyglykol M 5000, Clariant). |
| PG | is propylene glycol |
| DMT | is dimethyl terephthalate |
| IPT | is tetraisopropyl orthotitanate |
| NaOAc | is sodium acetate |

TABLE I

Polyester examples I to V and Comparative example I to II

| Polyester Reactant | Example I Weight [g] | Example II Weight [g] | Example III Weight [g] | Example IV Weight [g] | Example V Weight [g] | Comparative Example I Weight [g] | Comparative Example II Weight [g] |
|---|---|---|---|---|---|---|---|
| DMT | 100 | 100 | 100 | 17.62 | 12.53 | 100 | 100 |
| PG | 79.9 | 79.9 | 79.9 | 11.05 | 7.85 | 79.9 | 79.9 |
| NaOAc | 0.5 | 0.5 | 0.5 | 0.1 | 0.1 | 0.5 | 0.5 |
| IPT | 0.2 | 0.2 | 0.2 | 0.04 | 0.04 | 0.2 | 0.2 |
| mPEG1000 | | | | | | 325 | |
| mPEG2000 | | | | | | | 325 |

TABLE I-continued

Polyester examples I to V and Comparative example I to II

| Polyester Reactant | Example I Weight [g] | Example II Weight [g] | Example III Weight [g] | Example IV Weight [g] | Example V Weight [g] | Comparative Example I Weight [g] | Comparative Example II Weight [g] |
|---|---|---|---|---|---|---|---|
| mPEG3000 | 325 | | | | | | |
| mPEG4000 | | 325 | | | | | |
| mPEG5000 | | | 325 | 75 | 75 | | |
| Yield | 426.3 | 427.6 | 426.7 | 93.4 | 88.0 | 421.1 | 424.5 |

Comparative Example III

This polyester was prepared as described in DE 10 2007 013 217 (A1) Polyester 9 on page 25.

Comparative Example IV

This polyester was prepared as described in EP 2 276 824 (B1) Polyester 1 in Table 1 on page 20.

TABLE II

Properties of Polyester Examples I to V and Comparative examples I to IV

| | GPC Mw | Melting temperature [° C.] | Flow factor (ffc) | Appearance of 30 wt.-% solution |
|---|---|---|---|---|
| Example I | 8778 | 55.7 | 10 | Clear solution |
| Example II | 11270 | 57.9 | 10 | Clear solution |
| Example III | 9998 | 58.9 | 11 | Clear solution |
| Example IV | 9028 | 61.1 | — | — |
| Example V | 9338 | 63.3 | — | — |
| Comparative example I | 4374 | 36 | — | Clear solution |
| Comparative example II | 7338 | 52.5 | 9 | Turbid solution |
| Comparative example III | — | — | 40 | sediment |
| Comparative example IV | — | — | — | sediment |

Solution stability of the resulting polyesters was assessed by preparing a mixture of the prepared polyester (30 wt.-%) in water (20 wt.-%) and propylene glycol (50 wt.-%). The resulting mixtures were evaluated visually after two days of storage.

A series of exemplary liquid laundry detergent compositions, both according to the invention (with a polyester of the invention) and not according to the invention (without a polyester of the invention), were prepared according to Table III.

Key to ingredients used in the compositions of Table III and Table VI

LAS is $C_{12}$-14 linear alkylbenzene sulfonate, sodium salt

SLES 2EO is sodium lauryl ether sulfate with 2 moles EO (Genapol® LRO, Clariant).

NI 7EO is $C_{12-15}$ alcohol ethoxylate 7EO nonionic (Genapol® LA070, Clariant)

Fatty Acid is a $C_{12-18}$ stripped palm kernel fatty acid

SRP is a polyester prepared according to examples from Tables I and II

TABLE III

Liquid laundry detergent compositions for performance testing

| | wt.-% a.m. | |
|---|---|---|
| Ingredient | 1 | 2 |
| LAS | 5.20 | 5.20 |
| SLES 2EO | 6.50 | 6.50 |
| NI 7EO | 5.20 | 5.20 |
| Fatty Acid | 2.80 | 2.80 |
| Glycerol | 2.40 | 2.40 |
| Ethanol | 1.20 | 1.20 |
| Sodium citrate | 1.70 | 1.70 |
| Sodium tetraborate decahydrate | 2.00 | 2.00 |
| SRP | 0.00 | 1.00 |
| Demin water and NaOH to adjust pH | ad 100 | ad 100 |
| pH Value | 8.4 | 8.4 |
| Appearance at room temperature | clear | clear |

Soil Release Test

Liquid laundry detergent compositions of the invention were prepared according to the compositions listed in Table III. Powder detergent compositions were prepared from an IEC-A* base formulation by adding 1 wt.-% of polyester of the invention on top of the base formulation (IEC-A* base from WFK Testgewebe GmbH). The detergent formulations were tested for their soil release performance according to the "Dirty-Motor Oil" Test (DMO-Test) using a Lini Apparatus. The conditions for the test are listed in Table IV.

TABLE IV

Washing conditions-Soil Release Test

| Equipment | Linitest Plus (SDL Atlas) |
|---|---|
| Water hardness | 14° dH |
| Washing temperature | 40° C. |
| Washing time | 30 min |
| Detergent concentration | 4.3 g/l liquid detergent |
| | 3 g/l powder detergent |
| Soiled Fabric:Liquor Ratio | 1:40 |

As test fabric, white polyester standard swatches (WFK 30A from WFK Testgewebe GmbH) were used. The fabrics were prewashed three times with the laundry detergent compositions. The swatches were then rinsed, dried and soiled with 25 µl of dirty motor oil. After 1 hour the soiled fabrics were washed again with the same stored laundry detergent compositions used in the pre-washing step.

After rinsing and drying the washed swatches, a measurement of the remission of the stained fabric at 457 nm was made using a spectrophotometer (Datacolor 650).

The soil release performance is shown as an improvement in soil removal of the swatches washed with a formulation containing the polyesters of the invention (Soil Release Polymer, SRP) compared with the same formulation containing no SRP:

$$\Delta R = R_{with\ SRP} - R_{without\ SRP}$$

The washing results obtained for the laundry detergent compositions comprising the soil release polymers of the invention are shown in Table V and Table VI, expressed as ΔR along with the 95% confidence intervals.

TABLE V

Washing results liquid detergents

| Example No. | ΔR | 95% CI |
|---|---|---|
| I | 19.6 | 1.3 |
| III | 16.8 | 2.2 |
| Comparative I | 17.2 | 0.8 |
| Comparative III | 13.3 | 1.9 |
| Comparative IV | 12.4 | 1.1 |

TABLE VI

Washing results powder detergents

| Example No. | ΔR | 95% CI |
|---|---|---|
| I | 8.2 | 1.6 |
| III | 8.4 | 1.6 |
| Comparative I | 6.7 | 1.5 |
| Comparative III | 8.2 | 0.9 |
| Comparative IV | 5.8 | 2.0 |

Water Uptake Test

Polyester samples were stored at room temperature and 80% RH. The weight increase of the polyester samples was monitored over time and is shown in Table VII.

TABLE VII

Water uptake results for polyester powders

| Time [min] | Polyester Example III Water uptake [wt.-%] | Polyester Example Comparative III Water uptake [wt.-%] |
|---|---|---|
| 0 | 0.0 | 0.0 |
| 30 | 0.4 | 0.9 |
| 60 | 0.2 | 3.5 |
| 120 | −0.4 | 3.5 |
| 180 | −0.6 | 3.3 |

The invention claimed is:

1. A polyester comprising two or more of the structural units (a1), one or more of the structural units (a2) and either one or two of the terminal groups (a3)

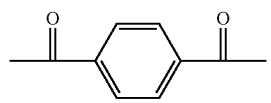 (a1)

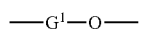 (a2)

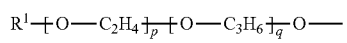 (a3)

wherein
G$^1$ is (OC$_2$H$_4$), (OC$_3$H$_6$), or a mixture of these,
R$^1$ is methyl,
p is, based on a molar average, a number of 60 to 130,
q is 0,
where
adjacent structural units (a1) are connected by the structural unit (a2);
in the case that only one terminal group (a3) is present in the polyester, the other terminal group is selected from the group consisting of OH, OCH$_3$, and G$^1$OH; and
both terminal groups are linked to acyl groups derived from a dicarboxylic acid.

2. The polyester according to claim 1, wherein G$^1$ is (OC$_3$H$_6$) or a mixture of (OC$_2$H$_4$) and (OC$_3$H$_6$).

3. The polyester according to claim 1, wherein the terminal groups (a3), based on the total weight of the polyester, comprise at least 50 wt.-%.

4. The polyester according to claim 1, wherein the weight average molecular weight (M$_w$) is from 6000 to 20000 g/mol.

5. The polyester according to claim 1, wherein the average number of structural units (a1) is from 2 to 60.

6. The polyester according to claim 1, wherein the total amount of structural units (a1) and (a2) and of the terminal group (a3), based on the total weight of the polyester, is at least 50 wt. %.

7. The polyester according to claim 1, wherein the polyester consists of structural units selected from the group consisting of structural units (a1) and (a2) and the respective terminal groups.

8. The polyester according to claim 1, comprising one or more structural units (a1'), —C(=O)-A-C(=O)— (a1')

where A is derived from a dicarboxylic acid different from terephthalic acid.

9. A process for the preparation of a polyester comprising two or more of the structural units (a1), one or more of the structural units (a2) and either one or two of the terminal groups (a3)

 (a1)

 (a2)

 (a3)

wherein
G$^1$ is (OC$_2$H$_4$), (OC$_3$H$_6$), or a mixture of these,
R$^1$ is methyl,
p is, based on a molar average, a number of 60 to 130,
q is 0,
where
adjacent structural units (a1) are connected by the structural unit (a2) 1
in the case that only one terminal group (a3) is present in the polyester, the other terminal group is selected from the group consisting of OH, OCH$_3$, and G$^1$OH; and
both terminal groups are linked to acyl groups derived from a dicarboxylic acid, the process comprising the steps of
heating dimethyl terephthalate, optionally one or more dimethyl esters of dicarboxylic acids, one or more glycols H-G$^1$-OH, and one or more alkyl capped polyalkylene glycols

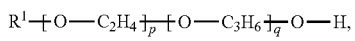

where the symbols and indices are as defined above in the presence of a catalyst, to temperatures of 160 to 220° C.; and continuing the reaction under reduced pressure at temperatures of from 160 to 240° C.

10. A solid or liquid detergent composition, comprising a) one or more polyesters according to claim 1, and b) one or more surfactants.

11. The composition according to claim 10, wherein the one or more polyesters a) are present in an amount of at least 0.1 wt.-%, based on the total weight of the detergent composition.

12. The composition according to claim 10, wherein the one or more surfactants b) are present in an amount of at least 3 wt.-%, based on the total weight of the detergent composition.

13. The composition according to claim 10, wherein the detergent composition is a liquid.

14. The composition according to claim 10, wherein the detergent composition is a solid.

15. A method for enhancing soil removal during laundering by modifying the surface of a fabric that is being laundered comprising the step of contacting the fabric with a polyester comprising two or more of the structural units (a1), one or more of the structural units (a2) and either one or two of the terminal groups (a3)

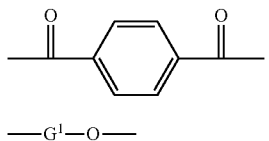

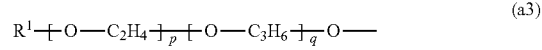

wherein
$G^1$ is $(OC_2H_4)$, $(OC_3H_6)$, or a mixture of these,
$R^1$ is methyl,
p is, based on a molar average, a number of 60 to 130,
q is 0,
where
adjacent structural units (a1) are connected by the structural unit (a2);
in the case that only one terminal group (a3) is present in the polyester, the other terminal group is selected from the group consisting of OH, OCH$_3$, and G$^1$OH; and
both terminal groups are linked to acyl groups derived from a dicarboxylic acid.

16. The polyester according to claim 1, wherein $G^1$ is $(OC_3H_6)$.

17. The polyester according to claim 8, comprising one or more structural units (a1'),

where A is derived from a dicarboxylic acid selected from phthalic acid, isophthalic acid, naphthalene-1,4-dicarboxylic acid, naphthalene-2,6,-dicarboxylic acid, tetrahydrophthalic acid, trimellitic acid, diphenoxyethane-4,4'-dicarboxylic acid, diphenyl-4,4'-dicarboxylic acid, 2,5-furandicarboxylic acid, 5-sulfoisophthalic acid, 3-sulfophthtalic acid, 4-sulfophthtalic acid, adipic acid, sebacic acid, decan-1, 10-dicarboxylic acid, fumaric acid, succinic acid, 1,4-cyclohexanedicarboxylic acid cyclohexanediacetic acid, glutaric acid, and azeleic acid.

18. The polyester according to claim 8, comprising one or more structural units (a1'),

where A is derived from 5-sulfoisophthalic acid.

* * * * *